United States Patent
Roberge (10) Patent No.: US 11,002,615 B2
(45) Date of Patent: May 11, 2021

(54) THERMOCHROMATIC TEST DEVICE FOR GAS TURBINE ENGINE

(71) Applicant: United Technologies Corporation, Farmington, CT (US)

(72) Inventor: Gary D. Roberge, Tolland, CT (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 135 days.

(21) Appl. No.: 16/355,959

(22) Filed: Mar. 18, 2019

(65) Prior Publication Data

US 2020/0300714 A1 Sep. 24, 2020

(51) Int. Cl.
  *G01K 11/12* (2021.01)
  *F16L 23/16* (2006.01)

(52) U.S. Cl.
  CPC ........... *G01K 11/12* (2013.01); *F16L 23/167* (2013.01); *F16L 2201/30* (2013.01)

(58) Field of Classification Search
  CPC ......... F16L 23/036; F16L 23/04; F16L 23/06; F16L 23/08; F16L 23/10; F16L 23/18; F16L 23/20; G01M 3/002; G01K 11/00; G01K 11/12–165
  USPC ................................ 285/364, 365, 406, 405
  See application file for complete search history.

(56) References Cited

U.S. PATENT DOCUMENTS

| | | | | |
|---|---|---|---|---|
| 312,406 A | * | 2/1885 | Towle, Jr. ............. | F16L 55/172 138/99 |
| 2,193,426 A | * | 3/1940 | Lazarides ............. | F16L 55/172 138/99 |
| 2,271,549 A | * | 2/1942 | Henderson ............ | F16L 23/003 285/45 |
| 2,977,995 A | * | 4/1961 | Walpole ................ | F16L 55/172 138/99 |
| 3,059,474 A | * | 10/1962 | Keiler ................... | G01K 11/06 374/106 |
| 3,246,916 A | * | 4/1966 | Hansen, Jr. ........... | F16L 23/167 285/45 |
| 3,347,569 A | * | 10/1967 | Lindgren .............. | F16L 13/002 285/64 |
| 3,669,474 A | * | 6/1972 | Bode ...................... | F16L 23/14 285/336 |
| 3,996,789 A | * | 12/1976 | Wilson .................. | G01M 3/042 73/40.5 R |
| 4,093,282 A | * | 6/1978 | Kyriakodis ........... | F16L 33/08 285/114 |

(Continued)

FOREIGN PATENT DOCUMENTS

| | | |
|---|---|---|
| EP | 2698503 | 2/2014 |
| WO | 2018082785 | 5/2018 |

OTHER PUBLICATIONS

European Search Report for European Patent Application No. 20163763.4 completed Jun. 16, 2020.

*Primary Examiner* — Alexander A Mercado
(74) *Attorney, Agent, or Firm* — Carlson, Gaskey & Olds, P.C.

(57) ABSTRACT

A gas turbine engine includes a joint and a flexible strip wrapped circumferentially around the joint. The flexible strip includes a lock operable to fasten the flexible strip about the joint. A thermochromatic layer is attached to a surface of the flexible strip and is operable to change color responsive to a change in temperature.

13 Claims, 4 Drawing Sheets

(56) References Cited

U.S. PATENT DOCUMENTS

| | | | | |
|---|---|---|---|---|
| 4,155,574 A * | 5/1979 | Hulsey | | F16L 21/005 138/96 R |
| 4,307,553 A * | 12/1981 | Puckett | | E04D 3/364 52/470 |
| 4,351,390 A * | 9/1982 | Argyle | | F28F 9/0226 165/149 |
| 4,457,517 A * | 7/1984 | Dunegan | | F16J 15/002 277/608 |
| 4,708,377 A * | 11/1987 | Hunting | | F16L 23/04 24/205 |
| 4,822,743 A * | 4/1989 | Wegrzyn | | G01N 21/91 116/201 |
| 4,889,167 A * | 12/1989 | Morris | | F16L 55/172 138/99 |
| 5,330,720 A * | 7/1994 | Sorbo | | G01M 3/183 277/320 |
| 5,564,838 A * | 10/1996 | Caillault | | F16B 21/183 384/448 |
| 5,617,849 A * | 4/1997 | Springett | | G01M 3/042 128/206.24 |
| 5,671,583 A * | 9/1997 | Turner | | E04F 13/06 52/745.15 |
| 6,974,249 B1 * | 12/2005 | Fair | | G01K 3/04 116/206 |
| 7,716,967 B2 | 5/2010 | Woods et al. | | |
| 9,145,514 B2 * | 9/2015 | Shirase | | C09K 9/02 |
| 10,365,178 B2 * | 7/2019 | Ling | | G01M 3/165 |
| 10,550,273 B2 * | 2/2020 | Lehmann | | C09D 5/26 |
| 2007/0113890 A1 * | 5/2007 | Woods | | F16L 23/167 137/15.11 |
| 2008/0130708 A1 * | 6/2008 | Coney | | G01K 13/02 374/144 |
| 2011/0020543 A1 * | 1/2011 | Behnke | | F01D 9/06 427/230 |
| 2011/0140415 A1 * | 6/2011 | Flynn | | F16L 23/06 285/320 |
| 2013/0100548 A1 * | 4/2013 | Angelini | | G02B 19/0023 359/853 |
| 2014/0091485 A1 * | 4/2014 | Watson | | B05B 1/3073 261/66 |
| 2016/0201719 A1 * | 7/2016 | Gorges | | F16C 41/008 116/216 |
| 2016/0281889 A1 * | 9/2016 | Huber | | F16L 21/08 |
| 2017/0016539 A1 * | 1/2017 | Sabotta | | G01L 1/24 |
| 2018/0202888 A1 * | 7/2018 | Tarafder | | G01N 30/34 |

\* cited by examiner

THERMOCHROMATIC TEST DEVICE FOR GAS TURBINE ENGINE

STATEMENT REGARDING FEDERALLY SPONSORED RESEARCH OR DEVELOPMENT

This invention was made with Government support awarded by the United States. The Government has certain rights in this invention.

BACKGROUND

Experimental and developmental engines utilize internal and external instrumentation and sensors to calculate engine performance. One variable that can add uncertainty to these calculations is engine leakage, which typically occurs at flanges, and other case/duct joints (bosses, etc.). A first step in estimating the flow being lost due to leakage is to detect that the presence and location of the leakage. As an example, infrared cameras are used to thermally observe the engine during testing to evaluate leakage. However, such cameras are limited in the locations at which they can detect leakages.

SUMMARY

A gas turbine engine according to an example of the present disclosure includes a joint, a flexible strip secured circumferentially around the joint, and a thermochromatic layer attached to a surface of the flexible strip.

In a further embodiment of any of the foregoing embodiments, the joint is a flange joint.

In a further embodiment of any of the foregoing embodiments, the flexible strip is a metal strip.

In a further embodiment of any of the foregoing embodiments, the thermochromatic layer is continuous from end-to-end of the flexible strip.

In a further embodiment of any of the foregoing embodiments, the thermochromatic layer is discontinuous between ends of the flexible strip.

A further embodiment of any of the foregoing embodiments includes a lock operable to secure the flexible strip circumferentially around the joint, wherein the lock is a buckle.

In a further embodiment of any of the foregoing embodiments, the buckle includes spaced-apart flexible tabs and slots between the spaced-apart flexible tabs.

In a further embodiment of any of the foregoing embodiments, the spaced-apart flexible tabs are folded onto sides of the joint.

In a further embodiment of any of the foregoing embodiments, first and second end portions of the flexible strip overlap around the joint, and the spaced-apart flexible tabs on the first end portion are folded into the slots of the second end portion.

In a further embodiment of any of the foregoing embodiments, the thermochromatic layer is continuous from end-to-end of the flexible strip.

In a further embodiment of any of the foregoing embodiments, the thermochromatic layer is discontinuous between ends of the flexible strip.

A thermochromatic test device according to an example of the present disclosure includes a flexible strip configured to be secured circumferentially wrapped around a joint of a gas turbine engine, and a thermochromatic layer attached to a surface of the flexible strip.

In a further embodiment of any of the foregoing embodiments, the thermochromatic layer is continuous from end-to-end of the flexible strip.

In a further embodiment of any of the foregoing embodiments, the thermochromatic layer is discontinuous between end of the flexible strip.

A further embodiment of any of the foregoing embodiments includes a lock operable to secure the flexible strip circumferentially around the joint, wherein the lock is a buckle.

In a further embodiment of any of the foregoing embodiments, the buckle includes spaced-apart flexible tabs and slots between the spaced-apart flexible tabs.

A method for detecting leaks in a gas turbine engine according to an example of the present disclosure includes providing a thermochromatic test device that includes a flexible strip, a lock operable to fasten the flexible strip, and a thermochromatic layer attached to a surface of the flexible strip. The thermochromatic layer is operable to change color responsive to a change in temperature. The flexible strip is circumferentially wrapped around a joint of a gas turbine engine and then secured in place. The gas turbine engine is then operated, and the thermochromatic test device inspected to determine whether the thermochromatic layer has changed color. A change in color is indicative of a leak in the joint during the operating of the gas turbine engine.

In a further embodiment of any of the foregoing embodiments, the flexible strip includes a buckle, and the fastening includes securing the buckle.

In a further embodiment of any of the foregoing embodiments, the wrapping of the flexible strip around the joint includes overlapping first and second end portions of the flexible strip.

In a further embodiment of any of the foregoing embodiments, the buckle includes spaced-apart flexible tabs and slots between the spaced-apart flexible tabs, and the securing of the buckle includes folding the spaced-apart flexible tabs on the first end portion into the slots of the second end portion.

BRIEF DESCRIPTION OF THE DRAWINGS

The various features and advantages of the present disclosure will become apparent to those skilled in the art from the following detailed description. The drawings that accompany the detailed description can be briefly described as follows.

DETAILED DESCRIPTION

Figure 1:
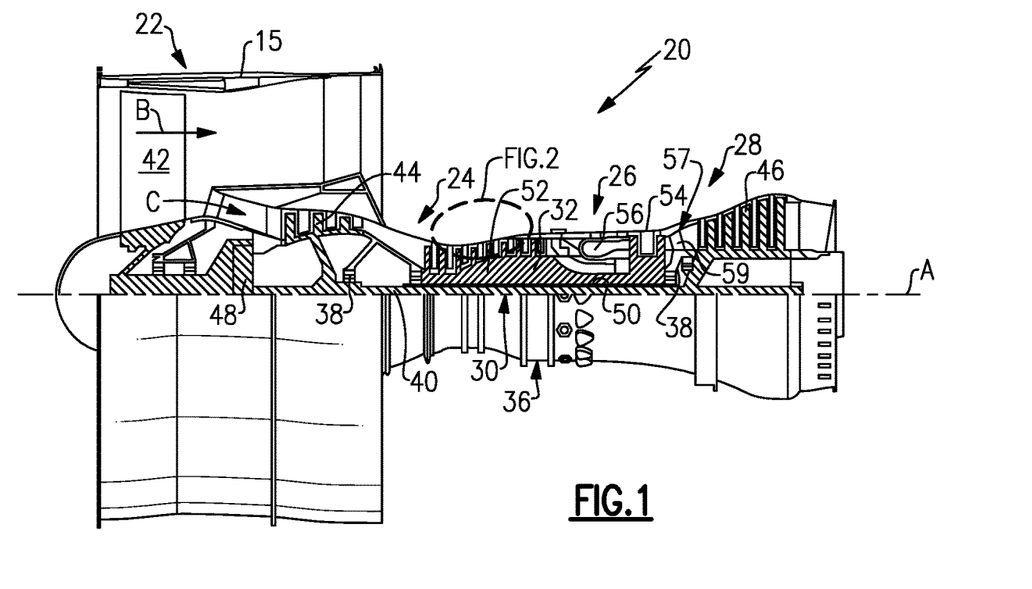
FIG. 1 illustrates an example gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 drives air along a bypass flow path B in a bypass duct defined within a case 15, and also drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive a fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 may be arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of the low pressure compressor, or aft of the combustor section 26 or even aft of turbine section 28, and fan 42 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the w pressure turbine 46 prior to an exhaust nozzle. The geared architecture 48 may be an epicycle gear train, such as a planetary gear system or other gear system, with a gear reduction ratio of greater than about 2.3:1 and less than about 5:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram° R)/(518.7° R)]^{0.5}$. The "Low corrected fan tip speed" as disclosed herein according to one non-limiting embodiment is less than about 1150 ft/second (350.5 meters/second).

Figure 2:
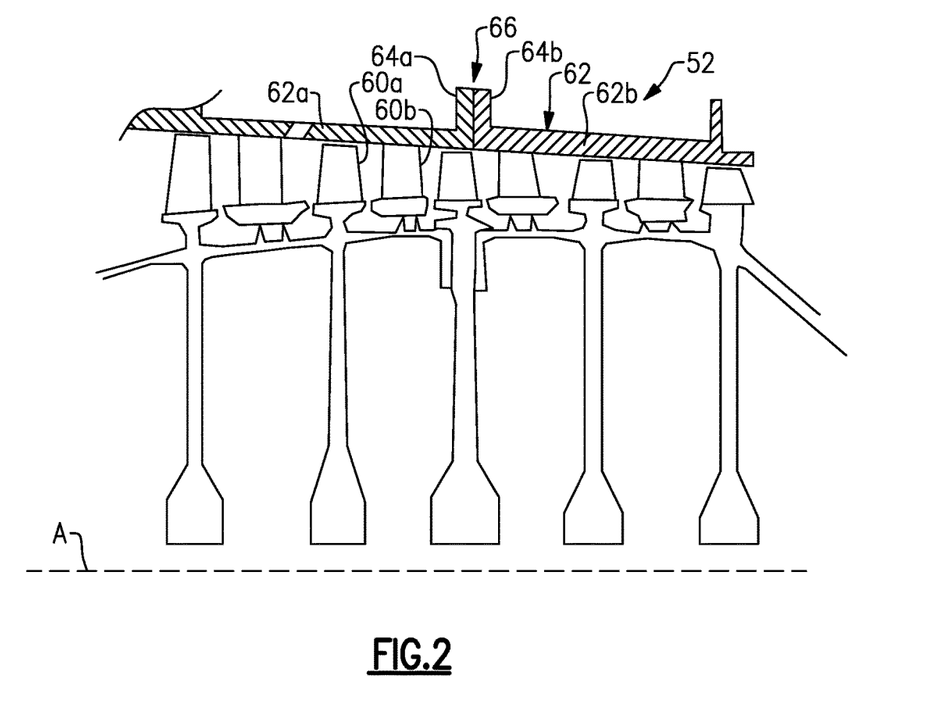
FIG. 2 illustrates a region in the high pressure compressor of the engine.
Figure 3:
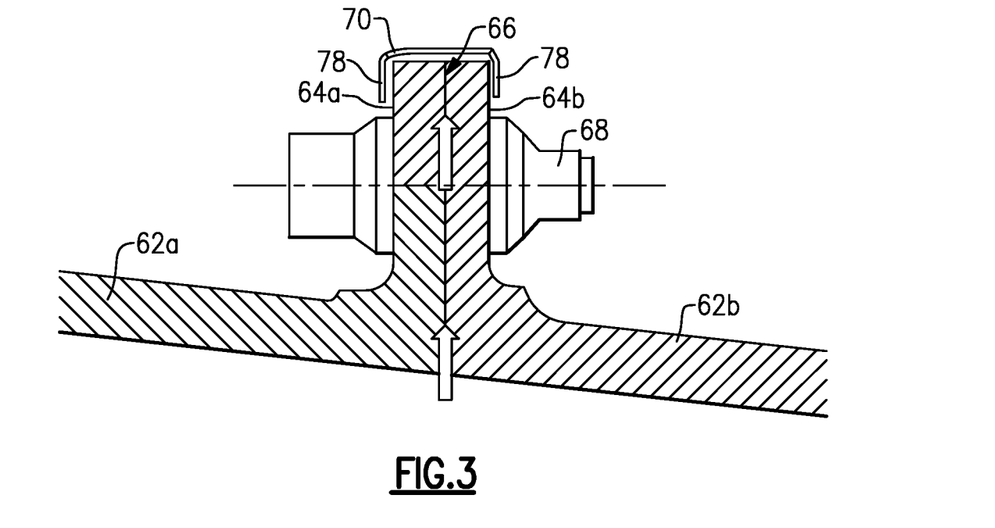
FIG. 3 illustrates a flange joint in the engine.

FIG. 2 illustrates a sectioned view of a region from the high pressure compressor 52, including compressor blades 60a, compressor vanes 60b, and a compressor case 62 surrounding the blades 60a and vanes 60b. The compressor case 62 is a multi-piece case and includes a forward case 62a and an aft case 62b. The cases 62a/62b include respective flanges 64a/64b. As shown in FIG. 3, the flanges 64a/64b may be secured together in a joint 66 by fasteners 68 (one shown) around the circumference. The joint 66 extends entirely circumferentially around the case 62.

The joint 66 in the compressor case 62 is an example location where leakage can occur in the engine 20. For instance, during engine operation, high pressure elevated temperature gas can escape between the flanges 64a/64, thereby debiting engine performance. Such leakage can occur for various reasons including, but not limited to, engine loads, component imperfections, dimensional tolerances, fastener torque, etc. in this regard, as depicted in FIG. 3, a thermochromatic test device 70 ("device 70") can be used on the joint 66 during engine operation to detect whether such leakage has occurred.

As will be appreciated, the engine 20 may include similar joints in the pressure compressor 44, high and low pressure turbine 46/54, and fan case 15. Although the examples herein are described with reference to the joint 66, it is to be understood that the device 70 may also be used on other joints in other sections of the engine 20.

Figure 4:
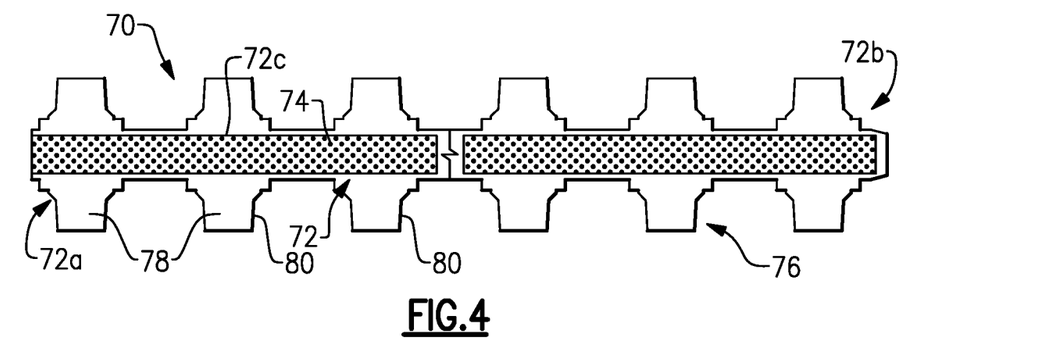
FIG. 4 illustrates a thermochromatic testing device that has a continuous thermochromatic layer.

FIG. 4 illustrates a representative view of the device 70. The device 70 includes a flexible strip 72 that defines first and second ends portions 72a/72b (the figure, a break is shown in the middle of the flexible strip 72 to indicate that the flexible strip 72 is longer than depicted). For example, the flexible strip 72 is a metal strip and may be cut or stamped from a piece of sheet metal. The metal is of suitable durability in that it can withstand the expected temperatures to which it will be exposed to during the engine operation without melting, substantially determining, or causing premature release of the device 70. For instance, the metal may be, but is not limited to, nickel alloys, steel, or aluminum.

The device 70 further includes a thermochromatic layer 74 attached to a surface 72a of the flexible strip 72. For example, the thermochromatic layer 74 is a thermochromatic paint that is applied onto, and adheres to, the surface 72a. In this regard, the surface 72a may be cleaned to remove impurities such as grease and oil, and/or etched prior to the application of the thermochromatic paint to enhance adhesion. For instance, the surface may be hand wiped with a rag or cloth and/or cleaned with propylene glycol methyl ether acetate and then air-dried. The surface may further be roughened, such as by sandpaper. The technique for application of the paint is not particularly limited and may be conducted manually or by automated equipment.

The thermochromatic layer 74 is temperature-sensitive and changes color in response to exposure to elevated temperatures. For instance, the composition of the thermochromatic layer 74 controls the temperature range over which the thermochromatic layer 74 responds to change color. In this regard, the composition of the thermochromatic layer 74 is selected such that the thermochromatic layer 74 is responsive to change color in a temperature range of interest for a given location in the engine 20 and expected exposure temperatures. The selected thermochromatic layer 74 is intended to be responsive in a temperature range that can differentiate the temperature of any leakage flow from the ambient operating environment of the device 70. Non-limiting example compositions may include MC350-8 (TMC Hallcrest), which has eight discrete color changes over a range from 670° F. to 2300° F., KN11 (Thermal Paint Services), which is useful from 250° F. to 575° F., and KN7A (Thermal Paint Services), which is useful from 630° F. to 2335° F. Given this disclosure, one of ordinary skill in the art will recognize and be able to select appropriate compositions for the thermochromatic layer 74.

The flexible strip 72 further includes a lock 76 that is operable to secure the flexible strip 72 around the joint 66. In this example, the lock 76 is a buckle and includes a series of spaced-apart flexible tabs 78 and slots 80 between the tabs 78. For example, the tabs 78 are provided as aligned pairs in which one tab 78 of the pair is located on one side of the flexible strip 72 and the other tab 78 of the pair is located on the opposite side of the flexible strip 72. Similarly, the slots 80 may also be provided as aligned pairs in which one slot 80 of the pair is located on one side of the flexible strip 72 and the other slot 80 of the pair is located on the opposite side of the flexible strip 72. As will described in further detail below, the flexible strip 72 is wrapped to overlap itself and the tabs 78 in the overlap portion are folded into the slots 80 to secure the device 70 on the joint 66.

Figure 5:
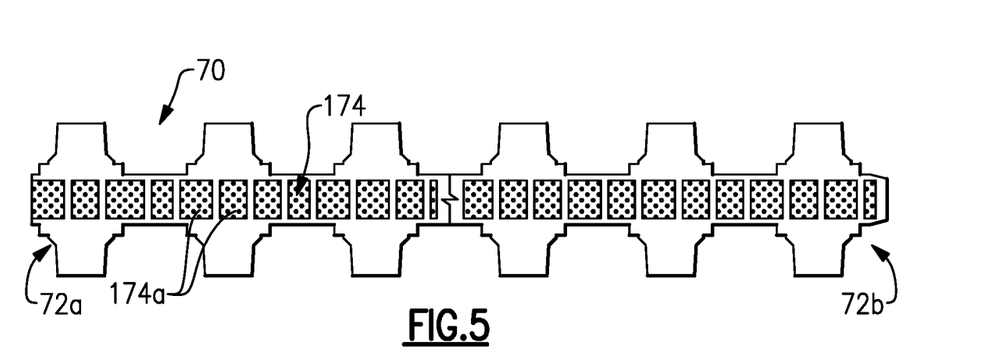
FIG. 5 illustrates a thermochromatic testing device that has a discontinuous thermochromatic layer.

In the illustrated example, the thermochromatic layer 74 is continuous from end-to-end 72a/72b of the flexible strip 72. The continuous configuration permits the thermochromatic layer 74 to detect elevated temperatures at all locations along the flexible strip 72. FIG. 5 illustrates a modified example of the flexible strip 72. In this example, the flexible strip includes a thermochromatic layer 174, similar to the layer 74 as described above except that the thermochromatic layer 174 is discontinuous between the ends 72a/72b of the flexible strip 72. For instance, the thermochromatic layer 174 is formed of discrete, spaced-apart patches 174a. The patches 174a may be uniformly spaced along the flexible strip 72. The regions between the patches 174a that do not have the thermochromatic material serve as flex joints to facilitate avoidance of the thermochromatic material dislodging when the flexible strip is wrapped around the joint 66. While joint 66 is depicted as axisymmetric (circular) in this embodiment, the device can also be deformed to be positioned on flanges of other shapes including elliptical and rectilinear.

Figure 6:
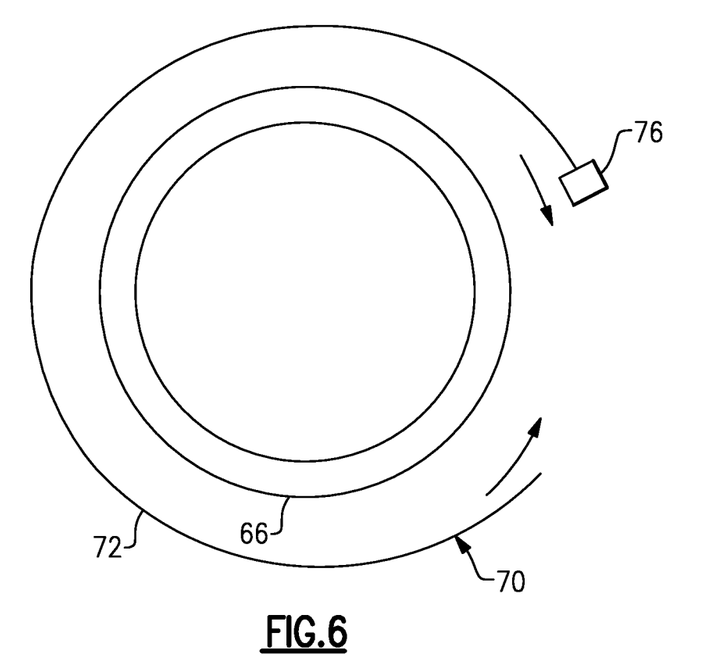
FIG. 6 illustrates wrapping of a thermochromatic testing device around a joint.
Figure 7:
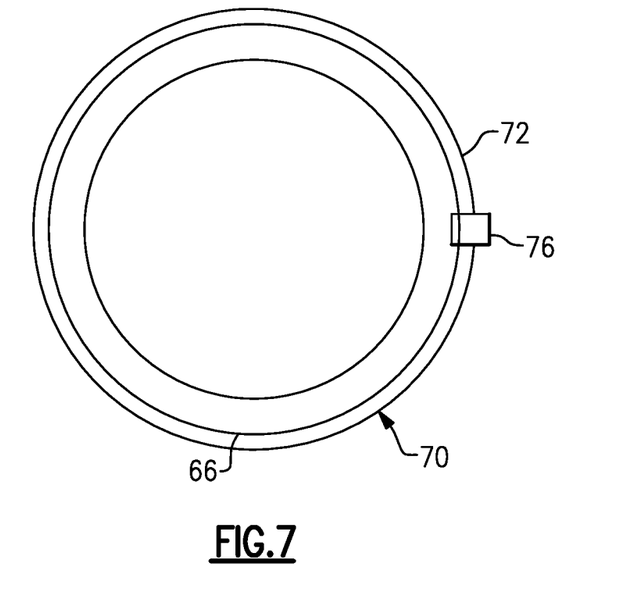
FIG. 7 illustrates a thermochromatic testing device secured around a joint of an engine.

The following figures schematically depict a method for detecting leaks in the gas turbine engine 20 using the device 70. In FIG. 6, the device 70 is first provided around the joint 66. For example, the device 70 may be circumferentially wrapped by an operator around the joint 66. As shown in FIG. 7, the device 70 is then secured about the joint 66, such as by securing the lock 76.

Figure 8:
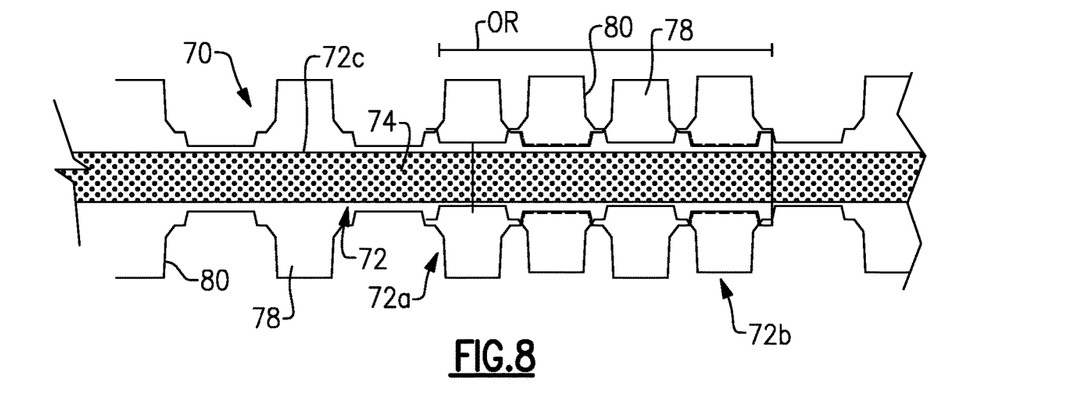
FIG. 8 illustrates securing a thermochromatic device using a locking feature.
Figure 9:
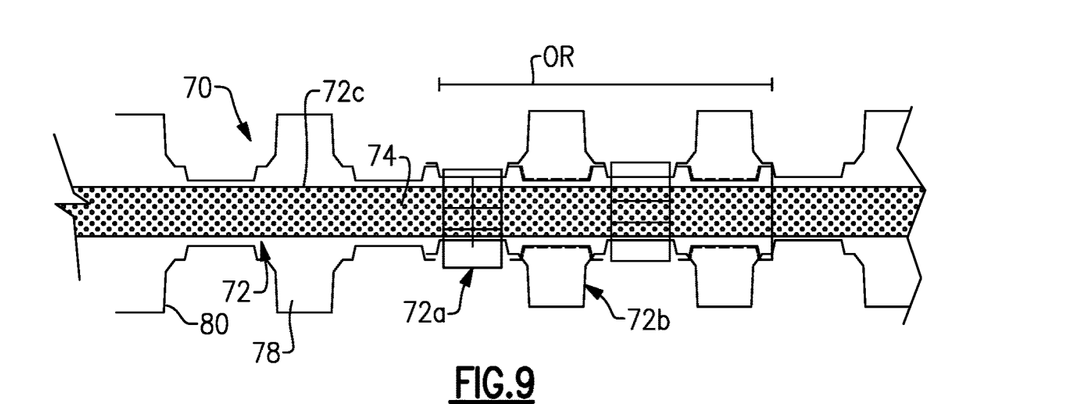
FIG. 9 illustrates the thermochromatic device of FIG. 8 after the lock is secured.

FIGS. 8 and 9 depict an example of securing the lock 76. In FIG. 7 the device 70 has been wrapped such that the end portions 72a/72b overlap in overlap region, designated at OR. In this example, the first end portion 72a is underneath the second end portion 72b. The tabs 78 on the first end portion 72a substantially align with the slots 80 on the second end portion 72b. As shown in FIG. 8, the tabs 78 on the first end portion 72a are folded into the slots 80 on the second end portion 72b. The tabs 78 thereby interdigitate or interlock over an overlapping distance with the slots 80, to lock the end portions 72a/72b together. In this example, the tabs 78 are folded over onto the second end portion 72b. Opposed tab pairs thus overlap each other once folded, capturing the second end portion 72b and thereby ensuring that that the device 70 is circumferentially secured. The tabs 78 on the second end portion 72b are folded down into the slots of the first end portion 72a. The remaining tabs 78 that are not on the overlap region are also folded down onto the side or sides of the flanges 64a/64b, as depicted in FIG. 3, in order to secure the device 70 axially on the flange joint 66 around the entire circumference of the joint 66. The securing of the device 70 axially helps to maintain the position of the device 70 on the joint 66 around the entire circumference of the joint 66, which otherwise could become wholly or partially displaced due to engine vibration and thereby invalidate the results. As will be appreciated, fewer or more tabs 78 and slots 80 may be used than shown, and the geometry of the tabs 78 and slots 80 may be varied from shown. Additionally or alternatively, the lock 76 may include a separate mechanical fastener, an adhesive, a clip, or the like that is capable of securing the device 70 on the joint.

Once the device 70 is secured, the engine 20 is operated. For example, the operation may be an engine test conducted on an engine test stand or on-wing on an aircraft. During the engine operation, since the device 70 is located on the joint 66, the device 70 will be exposed to any leakage of hot gases that occurs through the joint 66. In this regard, the temperature of the leaked gas changes the local temperature of the thermochromatic layer 74 on the device 70. In response, the thermochromatic layer 74 locally changes color identifying the circumferential location of leakage. The resulting color (e.g., red, orange, yellow, etc.) is indicative of the maximum temperature that the thermochromatic layer 74 was exposed to. In this regard, the device 70 is inspected after the engine operation has concluded to determine whether the thermochromatic layer 74 has changed color. Such an inspection may be conducted while the device 70 is on the joint 66, but more typically the device 70 will be removed from the joint and then inspected. The removal is not particularly limited. For instance, since the device 70 is single-use, it may be cut or severed to free it from the joint 66. Alternatively, the tabs 78 may be unfolded to free the device 70.

The inspection is used to determine whether the thermochromatic layer 74 has changed color. No color change or uniform color change along the device 70 is indicative that there was no leakage, or at least no leakage within the active temperature range of the thermochromatic layer 74. A change in color, especially in one or more localized regions of the device 70, is indicative of a leak in the joint 66. For instance, the inspection may involve a visual comparison between the resulting color or colors on the device 70 and a color wheel or other type of color indicator associated with the material of the thermochromatic layer 74. The color wheel shows the range of possible colors and the temperature ranges that correspond to each color. Thus, to identify the maximum exposure temperature, the color or colors on the device 70 are matched to a color on the color wheel.

Figure 10:
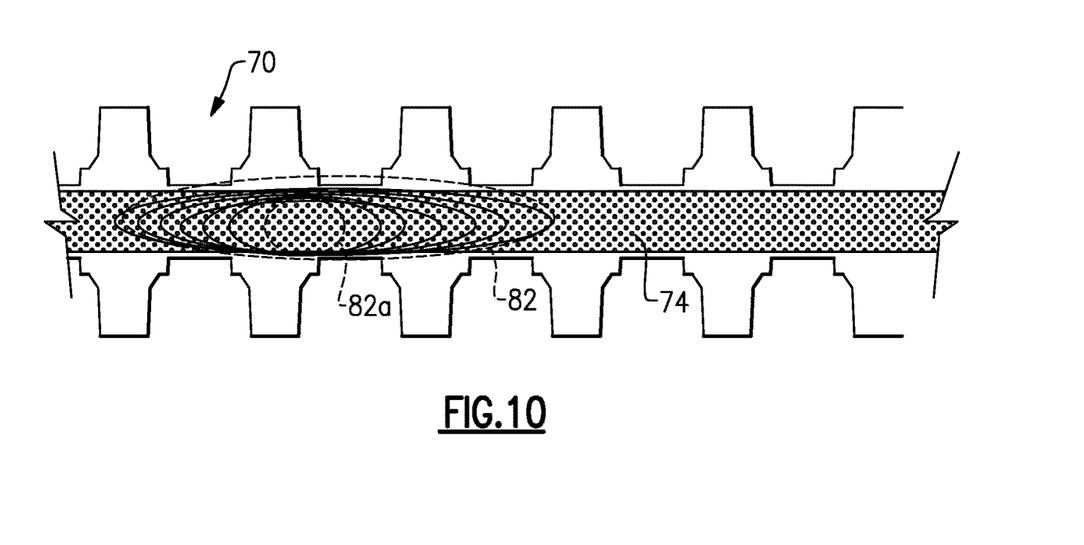
FIG. 10 illustrates a thermochromatic device after an engine test.

FIG. 10 depicts a portion of the device 70 after such a test. In this example, the thermochromatic layer 74 has changed color in region 82, with the largest change in color being in sub-region 82a. This likely indicates that there was a point of leakage in the location on the joint 66 that was under the sub-region 82a, which caused the largest color change in sub-region 82a, with smaller or less severe color change in the surrounding area that was not directly at the point of leakage. As will be appreciated, other types of leaks may cause different color changes on the device 70. The device 70 can thereby be used to qualitatively detect whether leaks occur and at what location or locations on the joint 66. Once such information is known, additional testing or analysis may be conducted to determine the cause and quantity of the leakage.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from this disclosure. The scope of legal protection given to this disclosure can only be determined by studying the following claims.

What is claimed is:

1. A gas turbine engine comprising:
   a joint;
   a flexible strip secured circumferentially around the joint;
   a thermochromatic layer attached to a surface of the flexible strip, and
   wherein the flexible strip defines first and second end portions, each of the first and second end portions including a series of spaced-apart flexible tabs and slots between the spaced-apart flexible tabs, the first and second end portions of the flexible strip overlapping length-wise such that the first end portion is on top of the second end portion, and the spaced-apart flexible tabs on the first end portion being folded around the second end portion into the slots of the second end portion so as to interdigitate with the spaced-apart flexible tabs of the second end portion, thereby locking the first and second end portions together.

2. The gas turbine engine as recited in claim 1, wherein the joint is a flange joint.

3. The gas turbine engine as recited in claim 1, wherein the flexible strip is a metal strip.

4. The gas turbine engine as recited in claim 1, wherein the thermochromatic layer is continuous from end-to-end of the flexible strip.

5. The gas turbine engine as recited in claim 1, wherein the thermochromatic layer is discontinuous between the first and second end portions of the flexible strip.

6. The gas turbine engine as recited in claim 1, wherein the spaced-apart flexible tabs are provided in pairs, the pairs comprised of first and second opposed tabs, and each of the pairs on the first end portion of the flexible strip are folded over onto the second end portion of the flexible strip such that the first and second opposed tabs are overlapped.

7. The gas turbine engine as recited in claim 6, wherein the first and second opposed tabs have a common geometry.

8. A thermochromatic test device comprising:
   a flexible strip configured to be secured to a joint of a gas turbine engine, such that the flexible strip is circumferentially wrapped around the joint;
   a thermochromatic layer attached to a surface of the flexible strip, and
   wherein the flexible strip defines first and second end portions, each of the first and second end portions including a series of spaced-apart flexible tabs and slots between the spaced-apart flexible tabs, the first and second end portions of the flexible strip overlapping length-wise such that the first end portion is on top of the second end portion, and the spaced-apart flexible tabs on the first end portion being folded around the second end portion into the slots of the second end portion so as to interdigitate with the spaced-apart flexible tabs of the second end portion, thereby locking the first and second end portions together.

9. The thermochromatic test device as recited in claim 8, wherein the thermochromatic layer is continuous from end-to-end of the flexible strip.

10. The thermochromatic test device as recited in claim 8, wherein the thermochromatic layer is discontinuous between the first and second end portions of the flexible strip.

11. The thermochromatic test device as recited in claim 8, wherein the spaced-apart flexible tabs are provided in pairs, the pairs comprised of first and second opposed tabs, and each of the pairs on the first end portion of the flexible strip are folded over onto the second end portion of the flexible strip such that the first and second opposed tabs are overlapped.

12. A method for detecting leaks in a gas turbine engine, the method comprising:
   providing a thermochromatic test device that includes a flexible strip, the flexible strip defines first and second end portions, each of the first and second end portions includes a series of spaced-apart flexible tabs and slots between the spaced-apart flexible tabs, and a thermochromatic layer attached to a surface of the flexible strip, the thermochromatic layer operable to change color responsive to a change in temperature;
   circumferentially wrapping the flexible strip around a joint of the gas turbine engine such that the first and second end portions of the flexible strip overlap length-wise and the first end portion is on top of the second end portion;
   securing the flexible strip about the joint such that the spaced-apart flexible tabs on the first end portion are folded around the second end portion into the slots of the second end portion so as to interdigitate with the spaced-apart flexible tabs of the second end portion and lock the first and second end portions together;
   operating the gas turbine engine; and
   inspecting the thermochromatic test device to determine whether the thermochromatic layer has changed color, wherein a change in color is indicative of a leak in the joint during the operating of the gas turbine engine.

13. The method as recited in claim 12, wherein the spaced-apart flexible tabs are provided in pairs, the pairs comprised of first and second opposed tabs, and each of the pairs on the first end portion of the flexible strip are folded over onto the second end portion of the flexible strip such that the first and second opposed tabs are overlapped.

* * * * *